United States Patent [19]

Murray

[11] 4,093,690

[45] June 6, 1978

[54] METHOD FOR THE MANUFACTURE OF CONCRETE AND LIKE PRODUCTS

[75] Inventor: John A. Murray, Norristown, Pa.

[73] Assignee: U.S. Terrazzo Panels, Inc., Bryn Mawr, Pa.

[21] Appl. No.: 735,502

[22] Filed: Oct. 26, 1976

Related U.S. Application Data

[63] Continuation of Ser. No. 534,203, Dec. 19, 1974, abandoned, which is a continuation of Ser. No. 336,362, Feb. 27, 1973, abandoned, which is a continuation-in-part of Ser. No. 106,364, Jan. 14, 1971, abandoned.

[51] Int. Cl.² ............................................. C04B 15/14
[52] U.S. Cl. ...................................... 264/82; 264/83; 264/162; 264/DIG. 43
[58] Field of Search ..................... 260/29.6 S; 264/82, 264/83, 162, DIG. 43

[56] References Cited

U.S. PATENT DOCUMENTS

| | | | |
|---|---|---|---|
| 3,305,506 | 2/1967 | Murray | 260/29.6 S |
| 3,468,993 | 9/1969 | Bierlich | 264/82 |
| 3,492,385 | 1/1970 | Simunic | 264/82 |

*Primary Examiner*—Thomas P. Pavelko

*Attorney, Agent, or Firm*—Miller & Prestia

[57] ABSTRACT

A method and apparatus is provided for the manufacture of products of concrete or like construction, in which a mixture of calcareous cementitious binder substance, such as cement, an aggregate, a vinyl acetate-dibutyl maleate copolymer, and an amount of water sufficient to make a relatively dry mixture is initially compressed into the desired configuration. This compressed shaped article is then subjected to an accelerated curing process in a chamber that is charged with carbon dioxide gas to provide a hardened product in an accelerated cure state having excellent physical properties, although the apparatus may be used, if desired, to provide only a desired amount of curing, as the circumstances may dictate. The method and apparatus of this invention is especially useful in the manufacture of panels, such as of terrazzo and terrazzo-like types and building panel elements of both load-bearing and non load-bearing types, concrete blocks, ceramic products, cinder blocks, bricks, adobe constructions, concrete pipe, drainage tile, silo block or staves, pre-cast tile, filler base, load bearing structures, non-load bearing or curtain wall structures, and pre-stressed products, among others.

13 Claims, 4 Drawing Figures

METHOD FOR THE MANUFACTURE OF CONCRETE AND LIKE PRODUCTS

CROSS-REFERENCE TO RELATED APPLICATIONS

This is a continuation of application Ser. No. 534,203 filed Dec. 19, 1974, now abandoned, which in turn is a continuation of application Ser. No. 336,362, filed Feb. 27, 1973 now abandoned which is a continuation in part of Ser. No. 106,364 filed Jan. 14, 1971, and now abandoned.

BACKGROUND OF THE INVENTION

This invention relates to a method and apparatus for the manufacture of concrete and like products, particularly, terrazzo and other panels, concrete and cinder block, and substantially all other conventional building products and the like.

The term "concrete", as it is employed in this specification, refers to a stone-like product obtained by blending a cement, aggregate such as sand, gravel, crushed stone, and many other like additives, and water together in appropriate amounts, and allowing the mixture to harden and reach an advanced state of cure. "Concrete-like" is extremely broader, and encompasses the materials having certain physical properties of concrete products, having perhaps substitutes for the cement normally used in concrete and perhaps substitutes for aggregate normally so used. They may be load-bearing or non load-bearing and may if desired include binders and/or aggregates that are selected to impart desired structural characteristics and/or decorative characteristics to the final product. The term "terrazzo-like", as used in this specification refers to a special form of concrete in which the aggregate used is selected so as to impart a decorative effect to the final product when exposed by grinding and polishing. The aggregate used in "terrazzo-like" panels can include, for example, marble dust, marble chips, granite chips, colored stones of various types, broken glass, brick and stone particles and the like, and various other aggregates. The term "terrazzo" itself is used, in this application, in a somewhat narrower sense, with reference to an aggregate having marble of the dust or chip type therein. In the parent application, Ser. No. 106,364, the term "terrazzo" was used in a broad sense, to have substantially the same meaning as does "terrazzo-like" in this application.

DESCRIPTION OF THE PRIOR ART

In the prior art method of manufacturing concrete products, for example, the cement, aggregate, additives if any, and water are blended in various ratios. In general, a sufficient amount of water is added to completely hydrate the cement and also to impart a degree of fluidity (substantial liquidity) to the blended mixture generally referred to as a wet mix. The blended mixture is then poured or compacted into a form and allowed to take an initial set. The initial set usually occurs within one-half hour to 4 hours, depending upon the temperature and the particular concrete mixture employed. The concrete product, after this initial set, is solid, but has very little strength. In order to obtain the maximum strength possible with a given concrete composition using the prior art manufacturing techniques, the concrete is generally allowed to cure for a period of time from several days, to several weeks.

The excessively long period of time required for both the initial set, and particularly for the development of the ultimate strength, causes considerable problems in the manufacture of cast concrete products. The concrete mixture must remain in the mold until the product acquires sufficient strength that it will not fall apart when the mold is removed. Furthermore, the concrete product, even after the mold is removed, must be allowed to cure for an extended period of time before it is subjected to any substantial stresses. The need to maintain the concrete products in the mold until the initial set is obtained, and for curing the products until the ultimate strength is developed requires a substantial inventory of molds and a rather large storage area for the products being processed. Of even greater consequence is the cost involved in the prior art processes since the handling of weak products obtained after the initial set and the storage of products for several days or weeks until fully cured is quite costly in both man power and storage space. Often, of even greater consequence is the cost in terms of rejects or of imperfections in the products due to internal stresses and even fractures that result from handling a weak product. Other deficiencies in prior art techniques include the shrinkage characteristics of the panels, especially high shrinkage during an extended period of cure, and differential shrinkage rates, e.g., between the outer surface and the inside of the product.

The problems encountered in handling the storage of concrete products using prior art processes can best be illustrated by conventional methods of manufacturing terrazzo panels. In the conventional method a concrete mixture containing the desired type of aggregate is either poured or compacted into a suitable panel mold. The mold is then stored until the mixture initially sets. This usually requires a discontinuous process, rather than a continuous sequence of steps. As the panel is initially stored, and until an advanced state of set takes place, the panel cannot be ground or polished since the machine involved, such as diamond grindng teeth, wheels, or the like, or other abrasive materials, would cause the panel to disintegrate, especially if the grinding was conducted at the high speeds that would normally be required for commercial production of terrazzo panels. Also, even just the water normally used for cooling during grinding would cause disintegration of the barely set but substantially uncured panel or other shape, unless the panel can first sit for about 12-24 hours. Accordingly, the panel has to be stored for days or weeks until substantially cured, and then, only subsequently, finished as by grinding, polishing or the like.

A further problem encountered with cast concrete products in general, and even other concrete-like products, and terrazzo products in particular, is that often, using the prior art processes, products are obtained which lack sufficient compressive strength. In order to compensate for the relatively low compressive strength, the products have to be cast with thicker cross-sections as the length and width increases so as to provide the required strength.

This material adds to the cost of the product, the cost of the transportation of the finished product, and the cost of installation of the product. As can be seen most readily with terrazzo panels, for example, which are used as floorings in many public buildings and the like, if the panels can be made stronger, thinner sections can be used that would have the same compressive strength or greater as the thicker panels that are also weaker in compressive strength. The use of thinner terrazzo floor panels directly reduces the material cost of the flooring, and indirectly would reduce the total cost of the building, in that the supporting structures for the flooring would not have to be as strong as heretofore, in order to support the lighter weight terrazzo panels.

Attempts have heretofore been made to decrease the cure time in the manufacture of concrete and like products. Such attempts have included the various types of accelerators that have been added to concrete mixtures, as well as heating and steaming processes, for use during manufacture. These methods at best have produced marginal improvements with respect to reducing the curing time and have been somewhat expensive. For example, in high pressure steam curing the product often had to be steamed for twelve to twenty-four hours, in order to obtain a satisfactory hardness and strength in the final product. In addition, certain of the processes had adverse effects upon the composition. High pressure steaming of concrete products containing substantial amounts of marble or limestone, for example, causes a very marked decrease in the ultimate compressive strength of the final product. Accordingly, these processes could not be used with terrazzo products which usually contain substantial amounts of marble dust or marble chips.

In order to increase the strength of concrete products certain additives have heretofore been suggested. These additives include materials which to some extent plasticize the finished concrete product so as to increase its compressive strength. Additives have been suggested to improve the properties of concrete products, including bituminous materials and various types of rubbers and emulsions of synthetic resins. One patent of significance, because it is primarily concerned with terrazzo-type concrete products is Murray, U.S. Pat. No. 3,305,506. Murray teaches the use of a vinyl acetate-dibutyl maleate copolymer for improving the compressive strength. It should be noted, however, that while these additives do have a definite beneficial effect upon improving the compressive strength of the product, the ultimate early compressive strength is still relatively low compared with products made in accordance with the present invention. This limits the use of concrete and like products having thin cross-sections in applications which require the material employed to carry considerable compressive loads.

In the broad field of concrete-like products, as opposed to concrete products, the developments of the prior art have similar limitations. For example, in the manufacture of ceramic products, brick products, adobe products, cinder block, concrete block, concrete pipe, drainage tile, silo block, silo staves, pre-cast tile, filler base (generally used as filler between layers of load-bearing portions of a product), load bearing products, non-load bearing or curtain wall products, and pre-stressed products, there exists substantial limitation upon curing time available, which consequently limits the rapidity with which such products may be manufactured and rendered usable. Similarly, the storage time involved with these products, as well as the cost of handling them, and as well as the manufacturing techniques involved all reflect the generally substantial curing time, and curing difficulties with such products. Accordingly, the remarks applied above with respect to concrete, and terrazzo products in particular, apply, in a general way, equally as well to all of the products enumerated immediately above.

Other prior art techniques have been developed that are usable, to a certain degree, with certain of the processes that have been developed for many of the materials set forth above. For example it is known to treat certain concrete-like products with carbon dioxide gas, by storing the products in a chamber that has been pre-charged with gas, for the purpose of effecting a skin cure on the surface of the products, and of a limited depth of cure, sufficient to enable further handling of the products. Indeed, generally, with the formation of a skin cure, that cure in itself inhibits deeper curing by the use of the carbon dioxide gas.

Other treatment processes have been developed, such as the use of alternate exposure to steam and carbon dioxide gas.

THE PRESENT INVENTION

The present invention relates to the treatment of and/or the accelerated curing, including the substantially fully curing of concrete and concrete-like products (in the broadest possible sense as discussed above), including specific apparatus directed theretoward, as well as including specific process steps, directed for use with the broadest possible range of materials. Accordingly, the present invention is not only directed to use with concrete products, such as terrazzo products, but for use with numerous other types of materials.

It is accordingly, an object of the present invention to overcome the above-mentioned and numerous other problems and difficulties existing in the prior art.

It is a further object of the invention to provide novel method and apparatus for rapidly substantially fully curing concrete and concrete-like products.

It is an additional object of the present invention to provide a process for accelerating the curing of concrete and like products, wherein the products have improved strength.

It is a further specific object of this invention to provide a method and apparatus for continuously manufacturing concrete products, concrete-like products, including terrazzo-type products.

It is a further object of this invention to provide, at the end of a manufacturing process an already substantially cured concrete or concrete-like product.

It is a further object of this invention to provide a novel treatment chamber for use with concrete-like products.

Other objects and advantages of the present invention will become readily apparent to those skilled in the art from a reading of the following brief descriptions of the drawing figures, detailed descriptions of the preferred embodiments, and the appended claims.

It will be noted that concrete and concrete-like products continue to undergo a state of curing for an indefinitely long period of time, perhaps thirty years or more. In this application, when reference is made to the substantially fully cured, completely cured, fully cured or the like, it will be understood that what is intended is that the cure is sufficiently advanced to enable not only handling of the product, but also further vigorous processing, such as but not limited to grinding, in that state of cure, without breaking, crumbling, or disintegration of the product, and that this substantially fully cured product continues to cure over a long period of time toward an absolutely complete cure.

SUMMARY OF THE INVENTION

The present invention is directed to providing method and apparatus, including method and apparatus components, wherein calcareous cementitious binder, such as cement, or other binders, the desired aggregate, a vinyl acetate-dibutyl maleate copolymer and a minor amount of water are initially blended. The relatively dry mix is then compressed into the desired shape in a mold. The shape thus formed is then fed through a chamber charged with carbon dioxide gas which causes a rapid exothermic reaction to occur during which the article is either mostly cured, or substantially fully cured in a matter of a few minutes, although the method and apparatus of this invention could be used to provide less than a substantially complete cure, if the circumstances made such a use so desirable. The cured product exhibits substantially improved physical properties, and in particular, compressive strength as compared to similar products produced in the conventional manner.

DESCRIPTION OF THE PREFERRED EMBODIMENTS

The initial step in the present invention is the preparation of the starting mixture. The starting mixture is comprised of four principal ingredients, namely calcareous cementitious binder, that may or may not include portland or like cements, an aggregate, a copolymer of vinyl-acetate and dibutyl maleate and water.

In many instances, it is desirable to utilize portland cement as the binder material. However, it has been found that other types of materials may be used in lieu of portland cement, or with portland cement, to give desired properties. In many instances, such mixture of portland cement and other binders may be dictated by economics, such as the availability of materials. In other instances, an alternate mix is specifically preferred, as to include various portions of other binders, in addition to, or instead of portland cement.

The cement which is used in the method of this invention can be the common commercially available types. In this specification specific reference will be made to portland cement but it should be appreciated that other similar hydraulic cements can likewise be used in the method of this invention. Portland cement compositions are comprised of about 60–70% by weight of CaO, 17–25% by weight of $SiO_2$, 3–8% by weight of $Al_2O_3$, minor amounts of other oxides such as $Fe_2O_3$, MgO, $Na_2O$, $K_2O$ and about 1–3% by weight of $SO_3$. As in all concrete-forming processes, it is important that the cement be kept as dry as possible prior to the formation of the starting mixture since the oxides comprising the cement will hydrate in the presence of water, and a weaker product will be obtained if the cement is partially hydrated prior to formation of the shaped article from the mixture.

In making certain types of materials, such as terrazzo panels or the like, the calcareous cementitious binder employed will be hydraulic cement, such as portland cement.

Other calcareous cementitious materials that may be used as binders include calcareous lime, metamorphic marble dust, calcareous lime dust, calcareous fly ash, calcareous cement of various types, such as white, grey, or block grey cement, aqua dust, calcareous lummite, calcareous quick lime, all of various types. For example, when marble dust is used, various grain sizes may be used, such as finer grain sizes, coarser grain sizes, etc. In this regard, it will be noted that aqua dust is a small grain size marble dust. All of these materials contain calcium carbonate, in one form or another, in that they are all calcareous. All of these materials are available at various locations in the earth, in that they are either found in sedimentary rocks, or in metamorphic rocks, for example, at various depths within the earth, in virtually every location of the earth.

The aggregates that are used in the present invention can be selected from almost an unlimited variety of different materials. The most commonly employed aggregates for use in the present invention are sand, gravel, marble dust, marble chips, granite dust, granite chips and crushed limestone, particularly if the end product is to be a terrazzo type product. However, other types of materials which can be advantageously employed as aggregates are sea shells, broken glass, especially colored glasses, and masonry-type building rubble such as crushed concrete, mortar and crushed bricks and stone. As can be seen from the above, the choice of the particular aggregate which can be used in a method of this invention is quite extensive.

The selection of the particular aggregate is dependent upon a combination of several factors. These include the physical properties desired in the final concrete product; the decorative effect desired in the final product, and the availability and the cost of the aggregate. The particular aggregate or combination of aggregates employed has a marked effect on the ultimate strength of the concrete product. As is well known, neat cement, when mixed with water and allowed to set and cure will develop a certain minimal amount of strength. However, when an aggregate is added, the aggregate reinforces the product and results in a product having a considerably higher ultimate strength. The strength of concrete products is dependent to a large extent upon the strength of the aggregate employed, with stronger aggregates resulting in stronger concrete products.

In accordance with the present invention, in its broader aspects, the aggregate may also be selected from a group that includes ground glass, sand, calcareous limestone, clay, siliceous shale, extrusive lava, siliceous silica flour, gravel, marble, marble dust, siliceous limestone, granite, coarse grained granite, shells, quartz, aqua dust, slate, calcareous sandstone, gneise, schist, siliceous trap, and quartzite, and even metallic components, such as steel rods, brass chips, etc. and forms thereof. Of course, the aggregates may be of various sizes. These aggregates are also generally available in nature, and comprise sediments, igneous materials, sedimentary materials, and metamorphic materials. In some instances, the metamorphic materials may be either follated, and in others non-follated, and still may function as aggregates. However, when such materials are used as binders, particularly when they are marble dust, such will be of the non-follated metamorphic type. Materials used as binders need not occur as rocks in nature, but such sedimentary and metamorphic materials may take various forms.

The particle size of the aggregate or blend of aggregates employed, is likewise important. In this regard, it will be noted that various aggregates of different types, may be mixed, with a single binder, or with a plurality of binders, in accordance with this invention. In any event, the use of large-size aggregate particles tends to increase the strength of concrete products. However, the use of only a large particle size aggregate can result in a relatively weak product since a considerable volume of air voids will form between the aggregate particles and considerably weaken the product, in some instances. Accordingly, the use of a combination of relatively fine aggregates and coarse aggregates in the proper balance will significantly enhance the ultimate properties of the final product.

The appearance desired in the final product is another factor to consider in the selection of the aggregate, especially if a terrazzo or other aesthetically desirable product is to be produced, since the aggregate will be exposed as a result of a polishing, grinding, finishing operation or the like. In producing terrazzo, for example, marble dust is most commonly used as the fine aggregate, and marble chips is the coarse aggregate. The color of the marble is varied according to the effect desired in the final product. Terrazzo-like products, however, are not limited to the use of marble as the sole aggregate. Quite striking effects are obtained with aggregate such as sea shells and broken glass which when ground and polished add distinctive effects to the terrazzo-like panels, as does lava (typically comprised of pumice and tepetate).

While the method of this invention is especially well suited to the preparation of the relatively exotic concrete products such as terrazzo panels, it should be appreciated that the method of this invention can also be used to make building blocks, and a whole range of concrete and concrete-like products and the like. Because of the relative speed and simplicity of the method of this invention, as well as the apparatus adapted for accomplishing the method of this invention, as will be explained in greater detail herein below, common masonry rubble which is obtained upon tearing down an existing structure can be crushed and used as an aggregate to form building panel elements, blocks and other building materials, for constructing new buildings.

One of the more essential components of the starting mixture of this invention is a copolymer of vinyl-acetate and dibutyl maleate. This particular copolymer appears to have a dual effect in the method of this invention. Initially it makes possible rapid cure of the starting compositions to obtain the final substantially fully cured product (advanced state of curing). When the copolymer is not included in the mixture, rapid curing is not obtained in the method of this invention. Secondly, as disclosed in Murray, U.S. Pat. No. 3,305,506, the disclosure of which is herein incorporated by reference, the copolymer has a definite beneficial effect upon the strength of the product. The relative proportion of the monomers comprising the copolymer can be varied considerably and still obtain satisfactory results. The optimum results, however, have been obtained with copolymers which are comprised of about three parts by weight of the vinyl-acetate monomer and one part by weight of the dibutyl maleate monomer. A commercially available copolymer of this type is available which is comprised of about 77% by weight of vinyl acetate and about 23% by weight of dibutyl maleate prepared in emulsion form using polyvinyl alcohol as a protective colloid.

The final essential starting material for mixtures employed in the method of this invention is water. Water, as is well known to those skilled in the art is required for hydration of the oxides comprising the portland cement. This is also true with respect to the other calcareous cementitious binders employed herewith. In prior art processes, an amount of water had to be used which was at least theoretically required for a complete hydration of the oxides comprising the portland cement. In general, a considerable excess was employed in order to compensate for the amounts of water required for wetting out of the aggregate and also provide a somewhat fluid mixture to facilitate the handling of the concrete mixture. As will be pointed out below in greater detail, in the method of this invention a considerably lesser amount than the theoretical amount of water required for complete hydration is employed, and quite surprisingly, a superior product is obtained. Furthermore, in general, a considerably lesser amount of liquid, or moisture, that includes the copolymer discussed above and the water together, is employed, in the practice of the present invention than the theoretical amount of water ordinarily required for complete hydration. The water used in the method of this invention does not require any particular pre-treatment, but is of the type that is ordinarily available, and of which is ordinarily used to make concrete. It will further be noted that other additives may be employed, in conjunction with the practice of this invention, such as dyes, colorings and the like, either being added with the water or copolymer, or such may be employed as parts of the aggregate utilized, or even as components of the binder that is utilized.

The proportions of the ingredients comprising the starting components are quite important, as has been mentioned heretofore. For making many concrete products, such as, but not limited to terrazzo and terrazzo-like panel products, the essentially dry starting mix should generally contain about 60–75% by weight of the aggregate which can be a combination of both fine aggregate and coarse aggregate in proportions required for obtaining the desired strength and decorative effect in the final product. The size of the aggregate is selected so that the starting mixture can readily be compressed to a given shaped article, relatively free of voids, with preferably less than 1–4% by volume of voids being present in the compressed product. For optimum results in making those concrete-like products that are terrazzo or terrazzo-like panels, the essentially dry mixture further contains about 20–25% by weight of hydraulic cement, such as portland cement, for making concrete products, such as, but not limited to terrazzo products or the like.

The two remaining essential components, that is, the copolymer and the water are present in relatively minor amounts. The vinyl-acetate dibutyl maleate copolymer is present in an amount of about 1–2% based upon the solids content of the resin.

The total weight of water in the moist composition is generally limited to about 5–10% and more preferably 4–8%, with optimum results being obtained with about 6% water, especially when making terrazzo-like panels.

In determining the amount of water to be added to the mixture, the water, if any, associated with the aggregate, as for example, when wet sand is used and the water present in the polymer emulsions, must be taken into consideration. The mixture may also contain other additives such as dyes, pigments and the like.

It will be noted that the term concrete-like has been employed throughout the specification, and that such includes concrete products that in turn include but are not limited to terrazzo products, and further, the term concrete-like, as applied to products includes ceramic products, bricks, block such as concrete block and cinder block, and other blocks, precast tile, filler base, load bearing walls or panels and other structures, unitized non-load bearing or curtain walls or panels, and pre-stressed products (those having steel rod or the like imbedded therein), for example.

It will be understood that the proportions of the binders, aggregates, chemicals and water, may vary depending upon the particular substances being employed, to yield a particular end product.

It has been found that of the total amount of binder (referring to calcareous cementitious binder) and aggregate in a mix, the contribution of calcareous cementitious binder to the combination of the binder and aggregate may be as low as 6%, or as high as 100%, although the optimum, for a given end product will be somewhere between those ranges. Furthermore, that binder may comprise no hydraulic cement (such as portland cement), or may be completely hydraulic cement. The variations herein will naturally affect the desired product. For example, a product that may be cured in accordance with the present invention can be constructed that may be usable for some purpose, such as for filler between outside and inside layers of building blocks, for example, but which would have very little inherent strength in and of itself. However, the product may be usable as a substance that is commonly known as filler base, wherein it does not, in and of itself, require strength. Thus, optimum percentages will exist for the binder, for the aggregate, for the copolymer, and for the water, within the end range limits set forth herein.

Similarly, if 6% of the combination of binder and aggregate, comprises binder, the remainder of those two (binder and aggregate), or 94%, would be aggregate. Conversely, no aggregate would be used if the binder is to comprise 100% of the contribution of binder and aggregate to the mix, and such mix is generally a dry mix.

Furthermore, the percentage by weight of water and vinyl acetate-dibutyl maleate copolymer together in the moist mix may vary between about 3% and as high as 20% (of the final mix of binder, aggregate, copolymer and water), although the optimum for a given desired end result, such as strength, or any other desired result will probably be somewhere between those values. Likewise, while the weight ratio of water to vinyl acetate-dibutyl maleate copolymer, in a given mix will be generally within the range of 2:1 to 4:1, an optimum weight ratio may be 3:1, for example. Obviously, certain factors, such as economics, for example, may dictate the undesirability of utilizing a moisture content of the final mix, as high as 20%, but as has been set forth above, a product that is usable for some purpose can be obtainable with a moisture (copolymer and water) content that amounts to 20% by weight of the mix of binder, aggregate, copolymer and water.

For example, in the manufacture of ceramic products, of the contribution of binder and aggregate to the mix, about 18% by weight of the contribution may comprise portland cement, and about 52% of such contribution may comprise either calcareous lime, or metamorphic marble dust, for example, whereby the total percentage by weight of the binder is about 70%, with the aggregate comprising about 30% by weight of this contribution. To this combination of binder and aggregate, there would then be added sufficient moisture to bring the moisture level up to some desired level such as 6% by weight, of the total mix. This moisture may be added, for example, by premixing the dry components (that is the cement or other binder and the aggregate), so that a uniform blend is obtained prior to the addition of the liquid ingredients. Then, because of the relatively minor amount of the liquids involved, it is preferable to spray the dry mixture with a mixture of the copolymer and water. The mixing is then continued until the total mixture is uniformly blended. The above-mentioned 6% moisture is thus preferably obtained by spraying it onto the otherwise dry mix of binder and aggregate, with the moisture comprising the above-mentioned copolymer and water, in a preferred ratio of three parts water to one part copolymer, but having an acceptable range of about two parts water to one part copolymer to four parts water to one part copolymer. The copolymer itself is preferably comprised of about three parts by weight of vinyl acetate and one part by weight of dibutyl maleate. In making a brick, the dry mix (dry mix being considered as being the mix of binder and aggregate only) may comprise, preferably, from 0% portland cement, to about 46% portland cement, with the remaining binder comprising calcareous lime, calcareous cement, or calcareous fly ash, for example. The percentage of aggregate in the dry mix may preferably vary from 54% to 92%, and the particular aggregate employed may preferably be clay, siliceous shale, sand, extusive lava, and/or siliceous silica flour, for example. The percentage of moisture in the moist mix (moist mix meaning the overall mix of binder, aggregate, copolymer and water), may vary from 3.7% to 5.2%, as a preferred range.

The composition of the moisture employed for brick, and for most other products, will be generally the same as that discussed above for ceramic products, as well as the relative distributions of components of the copolymer.

In making block, or even for example, concrete pipe, drainage tile, silo block, silo staves, concrete brick, for example, the binder employed may be calcareous lime, calcareous lime dust, calcareous fly ash, non-follated marble dust, calcareous cement, preferably being added to a given percentage of portland cement, and mixed with an aggregate, such that the percentage of aggregate in the mix will comprise the bulk of the dry mix. However, the range of aggregate employed, once again, may vary substantially, and still obtain a workable product. Similarly, the percentage of moisture in the mix (moist mix), while it may vary from about 3% to about 20% such will preferably be within the range of 3.1% to about 10%, and most preferably within the range of about 5 to 6%, based upon, once again, the weight percentage of total moisture in the moist mix.

Likewise, pre-cast tile may utilize as little as no portland cement, combined, generally, with some other binder, such as a marble dust, lime, lummite, fly ash, etc., all calcareous in nature, in a desired percentage, with preferably some aggregate such as quartz, sand, slate, aqua dust, chips, shells, marble, etc., and with some desired percentage of moisture in the mix. It will be understood, that the percentage of moisture in any mix will be dictated to some degree by the economics involved in that there is a point wherein the expense of the chemical in the mix provides a diminishing return. Conversely, there is a point wherein too little chemical in the moist mix, compared to the amount of water, places limitations upon strength. This will be a more severe problem in the construction of load-bearing products, than for example, in the construction of a filler base.

In constructing a filler base product, the binder, may for example, comprise calcareous lime dust, calcareous fly ash, calcareous cement, with the addition of some portland cement, if desired, and with the aggregate comprising generally a high percentage of sand, or calcareous limestone. In the construction of a load bearing wall, for example, the binder may comprise portland cement, calcareous cement, calcareous lime dust, or a mixture of any of them, as may be the situation for any of the binders suggested herein, it being sometimes desirable to mix various types of binders, and with the aggregate employed comprising, for example, sand, gravel, marble, marble dust or the like, with some suitable percentage of moisture being added.

In the construction of a non-load bearing or curtain wall structures, for example, the binder may comprise a certain percentage of portland cement, and another percentage of other calcareous cements, such as white cement, grey cement, etc. or the like, and with the binder comprising sand, marble, or the like. Again, some suitable percentage of moisture (water and copolymer) being added thereto.

In the manufacture of pre-stressed products, again the binder may comprise calcareous cement, calcareous quick lime, portland cement, or a mixture of any of these, with a suitable aggregate such as sand, gravel, calcareous sandstone, gneise, schist, siliceous trap, calcareous limestone, non-follated marble, non-follated quartzite, intrusive granite, etc., again with some desired percentage of moisture (copolymer and water) added thereto in a desired ratio.

It is thus apparent, that the present invention has applicability to an extremely wide range of products, and to an extremely wide range of various qualities of each of those products, depending upon the particular mix employed, both dry mix, and moist mix. As has been discussed above, it is generally preferable to spray the dry mix of binder and aggregate, with a mixture of copolymer and water. After the mix is uniformly blended, by continuing a mixing operation with respect thereto, the moist mixture thus obtained will appear to be relatively dry, as compared to fluid, soupy mixtures generally employed to make concrete products, in accordance with prior art techniques. Preferably, in accordance with this invention, the mixture should have the relatively stiff consistency similar to drained wet sand or the like.

The particular type of blending apparatus employed to obtain the starting mixture is not critical providing it sufficiently blends the starting materials. One type of blender which has, however, proven to be satisfactory is a turbine mixer, the delivery to which is accomplished by a screw conveyor since this provides a very complete mixture of the starting materials in a short period of time. Alternatively, a double screw blender could be utilized. In addition to the blender 10, a screw feed can be provided in the feed-line 12 to both further mix the ingredients of the mixture and also to facilitate the transfer and metering of the mixed material to the press 14. Alternately, the feed line 12 could perform no substantial mixing, but function only as a conveying device.

The press 14 is one of the more essential parts of the apparatus of this invention, in that it is generally necessary to press the moist mix obtained as discussed above, to have a given shape that is capable of being sustained during the remainder of the operation. It is a high pressure hydraulic press of the controlled-descent compressing cylinder type which is capable of exerting over a million pounds of pressure per square yard on the material being compressed. Positioned below the controlled-motion upper compressive member 16 of the press 14 is a cavity mold 18. The cavity mold shown is for making flat panels. The cavity mold has high walls in order to receive a sufficient amount of the starting mixture to form a panel of the desired thickness after compression. Associated with the cavity mold 18 is a removing or discharging means 20 for removing the pressed, uncured panel 22 from the cavity mold 18. The discharging, removing, or ejecting means may vary from the type 20 illustrated in FIG. 1, and for example may comprise a vacuum or suction lift from the press 14 through the member 16, separately or in addition to the type 20, to facilitate a removal or a discharge of even thin panels from the mold without unduly stressing the panels or other forms, and most particularly, without causing internal fractures therein. Assisting the discharging means 20, after the ejection means has upwardly lifted a given panel such as that 22, is a moving means 19, that may preferably comprise a component of the press, that facilitates the moving, depositing, or other transportation of the compacted panel or the like 22 onto an upper run 23 of the conveyor belt 24. It will be understood, that by making modifications in the upper compressive member 16, and in the mold 18, any suitable building structure may be compressed in the press, such as a building blocks, etc. all of which have been discussed at length therein. Accordingly, while the press, and the conveyor and chamber of this invention are illustrated with respect to their adaptability for making panels, blocks or the like, such should not be construed as being limiting, but only as representative of a particular type of product being processed.

The moist starting material, prepared as discussed herein above, is fed into the cavity of the mold 18, in a weighed amount sufficient to make a panel, block, brick, etc. or the like of the desired thickness. The cavity mold 18 is positioned below the member 16, and the press is activated. The member 16 compresses the mixture into a compacted shape, such as a panel or the like 22, which has sufficient structural integrity to be removed from the cavity mold by the ejector means, suction or the like 20, in cooperation with the transfer means or depositing means 19 or the like, without the shape 22 breaking apart. This uncured panel or shape 22, at this point, is capable of being handled, but it should be appreciated that if dropped, or roughly handled, it can be readily broken. The ability to form an unset, uncured shape such as a panel, brick, block, or any of the other configurations discussed herein above which does not require the use of a form to maintain its shape during further processing (downstream, or rightward of the press 14, with reference to FIG. 1), is believed to be due to the combination of the use of the high pressure in the molding process, and the presence of the copolymer in the mixture, as well as the use of a relatively low amount of water in the mixture. Because the starting material can be formed into the desired shape, and the mold thereafter immediately removed from the shaped article, it can be seen that an economic advantage is immediately obtained, in that it does not become necessary to maintain a large inventory of molds as has been required in many prior art types of processes, such large inventory of molds often having been necessary to maintain the desired shape of the article during subsequent curing operations.

Figure 1:
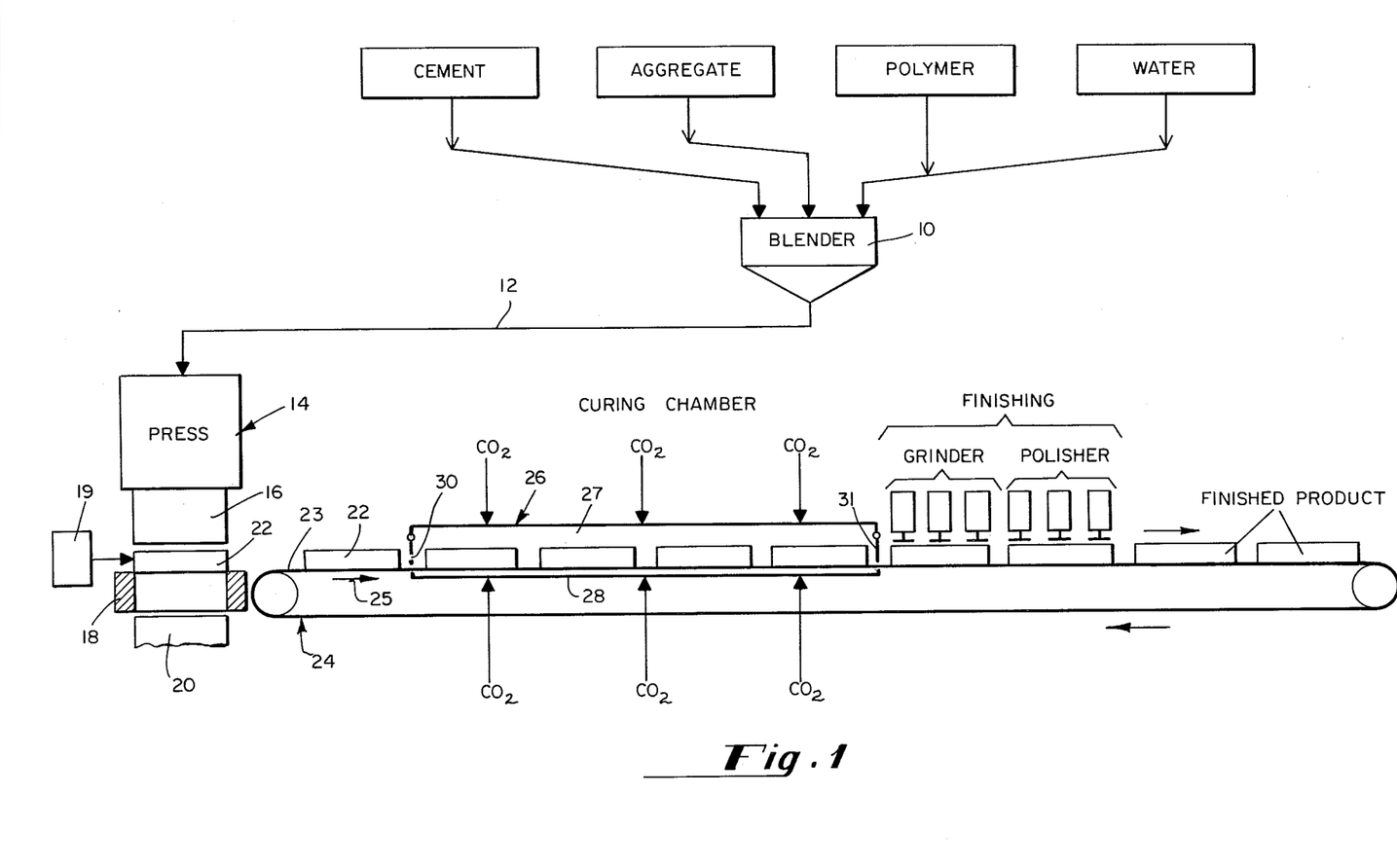
FIG. 1 is a schematic illustration in cross-section of an apparatus of this invention which is especially useful in the manufacture of products in accordance with this invention, including the manufacture of terrazzo panels.

After depositing the shape 22 onto the upper run 23 of the conveyor 24, the shape 22 is advanced rightward, as viewed in FIG. 1, in the direction of the arrow 25 thereof, while resting and being carried on the upper run 23 of the conveyor 24. The conveyor 24 is of the belt type, but specifically will preferably be constructed of linked chain or the like, to have voids through the bottom thereof, in order to allow permeation of the chain's upper run 23, with carbon dioxide gas, for treating the lower surface of the shape 22, that rests upon the run 23 of the belt or the like. Accordingly, the precise details of construction of the conveyor belt 24 may vary, within capabilities of accomplishing this end, of allowing permeation thereof, for subjecting the underneath of a shape 22 to the curing gas.

The velocity or speed of movement of the conveyor belt may vary, but, in the manufacture of panels of terrazzo or the like, for example, it has been found that a speed or velocity for the upper run 23 of the conveyor belt, of three linear feet per minute may, for example, be satisfactory. It will be understood that some movement of panels through the chamber is important and that the speed, of course, may vary, above or below this indicated value, as dictated to some degree by the amount of curing desired within the chamber, as well as the rapidity of curing that is desired, but principally as dictated by the desired frequency of supply of panels to, for example, a grinder.

The uncured panel 22 is advanced into a carbon dioxide chamber 26, such chamber 26 being clearly the most important single part of the apparatus of this invention. The chamber 26 should be built so as to be relatively gas tight. Thus, the chamber will have sides 27, along both sides of the conveyor belt 24, and a lower end 28, and its entry and exit ends 30 and 31 will be provided with flexible entry and exit curtains that function as gas retaining means. These curtains may, for example, be of the rubber flap type, or other suitable types that are activated by the panels or other products, to be moved aside by entry or exit of the product at the entrance and exit ends of the chamber 26 so as to retain a sufficient amount of the gas inside the chamber to maintain the desired carbon dioxide gas environment while permitting a flowing of the gas from the chamber through the curtains, but to minimize carbon dioxide losses as the panels 22 enter and leave the chamber 26. However, it will be understood that, considering that the panels or other shapes 22 are supported on the upper run 23 of a preferably open mesh chain type conveyor belt, for the above-mentioned purpose of allowing carbon dioxide gas to pass through the belt and contact the bottom portions of the shapes 22 during the processing within the chamber 26, it will be recognized that certain amounts of carbon dioxide gas will be carried out of the chamber 26 through the exit end 31 thereof, with the movement of the belt, and along with the shapes 22 as such shapes 22 pass outwardly because of the continuous movement of the belt through the chamber. Moreover, of course it will be understood that minor amounts of air and the like will enter the chamber 26, as portions of the upper run 23 of the conveyor belt 24 enter the chamber 26, and as the shapes themselves 22 enter the chamber 26, such air being that existing in the environment of the location of the chamber 26.

Furthermore, the inlet means 30 may be especially configured to have slits, opening ports, or merely to have a sufficiently loose curtain arrangement as to permit a controlled amount of carbon dioxide gas to emanate from the inside of the chamber 26, outwardly through the flexible means 30, in an upstream direction, or with a counter-current of flow, relative to the direction of movement of the shape 22 as it passes into the chamber 26. Of course, with the carbon dioxide gas within the chamber 26 being discharged through small openings, orifices, slits, or other openings in the retaining means 30, 31, this creates a flow of the carbon dioxide gas, directed outwardly of the chamber from inside thereof. As has been set forth above, this outward passage of gas, especially through the inlet end 30 of the chamber 26 is controlled and has been found to be specifically advantageous, in effecting a pre-ignition of the shapes 22, prior to their entering, or at least completely entering the chamber 26.

This pre-ignition has been found to have an advantageous, and pronounced effect, upon the curing of shapes, such that, by the use of this pre-ignition, immediately followed by the entry of the shape 22 into the chamber 26, for continued curing, the results are generally that the shape 22 undergoes a more effective, and more controlled cure, with the interior thereof being cured even more completely than without the pre-ignition.

For example, it has been found that, for the use of a terrazzo panel shape that is 36 inches square, and moving the conveyor belt 24 such that its upper run 23 carries the shape 22 at a speed of three feet per minute, it takes about one minute for the shape 22 to completely enter the chamber 26 from the time that its leading edge thereof first comes about into engagement with the flaps 30 at the inlet end of the chamber 26, to the time that its trailing edge passes the flaps 30. In this one minute time period, it has been found that a 48° temperature rise may be effected, in the interior of the panel 22, with such temperature rise continuing for perhaps another 24° (all degrees being measured in Fahrenheit). It will be noted that the controlled orifices, flow points, or other carbon dioxide passages at the inlet or flexible retaining means 30 of the chamber 26 may be arranged, or constructed in various ways, such as having small tubing outlets from the chamber, in the general vicinity of the inlet end thereof, such tubing outlets being disposed below, alongside, or above the flexible retaining means 30 if desired, all within the purview of the controlled inlet end leakage feature of this invention.

It has been found, for example, that the controlled carbon dioxide gas leakage at the inlet end of the chamber, begins to commence a rise in temperature, and consequently, commences an early state of curing, of the interior of the shapes 22, as well as the exterior thereof, even prior to the leading edge of the shape being delivered through the inlet 30 in the direction of the arrow 25 of FIG. 1. However, it is also necessary that the chamber 26 be employed, in that, as soon as the leading edge of the shape 22 begins to enter the chamber, the temperature rise of the interior of the shape increases dramatically.

Figure 2:
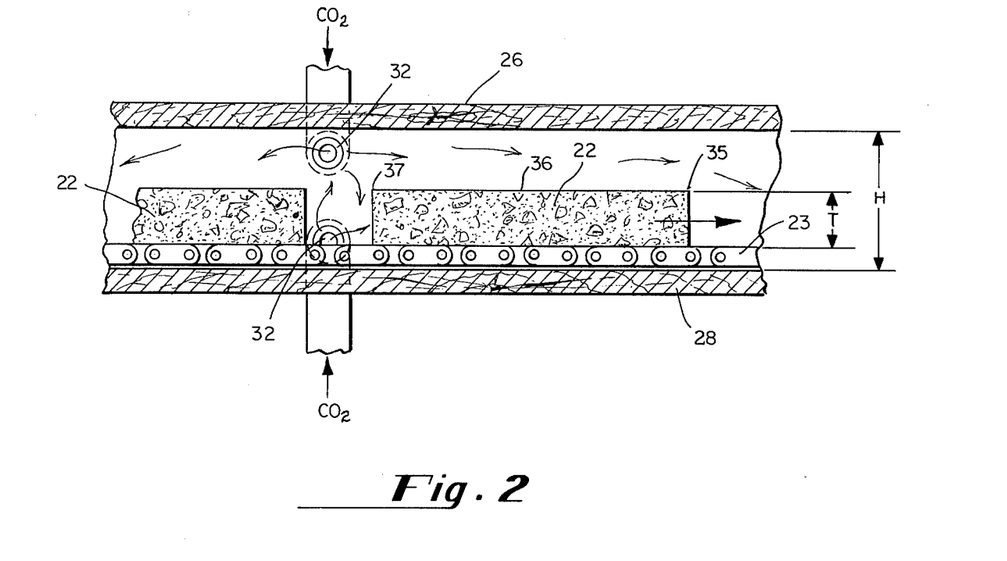
FIG. 2 is an enlarged fragmentary longitudinal sectional view, of a portion of the chamber illustrated in FIG. 1.

The chamber 26, with particular reference to FIG. 2, is provided with a plurality of inlets 32 for carbon dioxide gas, with such inlets 32 being provided at both the top and bottom, or upper and lower ends respectively of the chamber 26, preferably entering into side walls thereof, although being connected to the chamber 26, at any desired location, in order to obtain, preferably, an even desired flow and distribution within the chamber 26.

While only three such inlets 32 are illustrated in FIG. 1, it will be appreciated that a considerably larger number of such inlets are preferably employed to introduce the carbon dioxide gas into the chamber 26.

For maximum benefit of the processes and apparatus of this invention, the relative height of the chamber 26 is a highly critical factor, in effecting the advanced state of curing substantially completely throughout the thickness of the shapes. In order to obtain the maximum benefits of this invention, the height of the chamber 26 should not be excessive relative to the shape being cured. It has been found, based upon empirical data, that preferably the height of the chamber ("H" in FIG. 2) should be within the range of about 1.025 to about 4 times the thickness (height) of the panel or other shape ("T" in FIG. 2) being processed, subject to the further provision that the interior chamber height (H) should not exceed the height of the shape (T) by more than about 4½ inches. This would apply also to other shapes being processed, other than terrazzo-like panels for example, various building materials other than panels, such as bricks (few inches in thickness) cinder and concrete blocks (usually 7⅝ inch standard height), other building materials e.g. 12 inches in height, as well as even other structures not specifically limited to building materials, even if irregular in shape. The rate and the depth of cure are directly dependent upon the chamber height. This was found, for example, in tests wherein panels were subjected to this curing process under substantially the same conditions with the exception of the height of the curing chamber. It was found, for example, that a one inch thick panel would rapidly reach an advanced state of cure completely throughout its entire volume in a four inch chamber in about two to five minutes. It was further found that the same type of panel when fed through a chamber having a considerably greater height, namely about 18 inches, would at best skin cure and would have a soft uncured center portion. Further, as a result of this finding, the height of the chamber was gradually reduced and it was found that the proportion of the uncured center section was directly dependent upon the height of the chamber. As the chamber height was reduced, more of the panel reached an advanced state of cure (substantially cured) until the height of the chamber was reduced to a height wherein the entire thickness of the panel reached this advanced state of cure. It was further found that even extending the time of cure in chambers having an excessive height had no substantial effect upon the degree of cure obtained. The reason for the criticality of the chamber height is not known. With respect to terrazzo-like panels of about ¾ inch thickness, this height H can preferably be from 1½ to 4 times T, rather than the 1.025 lower limit, as dictated only by the practical consideration-namely reasonable allowance for thickness of a conveying means 23.

The carbon dioxide supplied to the chamber 26, through the ports or inlets 32 thereof may be obtained from any convenient source. Bottled carbon dioxide gas is the most conveniently used in most installations. The gas should be comprised essentially of carbon dioxide with at most minor amounts of other gases being present in the carbon dioxide. The pressure of the carbon dioxide which is maintained inside the chamber is substantially atmospheric pressure or 0 pounds per square inch gauge. It is preferred to operate this invention with the pressure being delivered through the ports 32 at a sufficiently low gauge pressure, e.g. 2 to 10 PSIG, that the pressure within the chamber 26 will be at atmospheric pressure, or substantially at atmospheric pressure, but not below. This will allow the carbon dioxide gas to seep or billow out of the inlet end 30 of the chamber 26, for the purpose above-discussed, and to prevent the infusion of atmospheric air, especially in undesired amounts, into the chamber. This is because the composition of atmosphere inside the chamber 26 should be essentially carbon dioxide. Under ideal conditions, the carbon dioxide content of the atmosphere inside the chamber 26 should be at least 95%, and preferably higher, for example, 98% plus.

In the method of this invention, as the shape, such as a panel, for example, is fed through the chamber 26 charged with carbon dioxide, there is a sudden exothermic reaction, that may, for example, commence as the leading edge of the shape enters the chamber inlet, wherein the temperature throughout the shape rises about 20° F to 60° F, and at least about 20° F to 40° F depending upon the mixture employed. The exothermic rise occurs in about 1½ to 5 minutes, and substantial exothermic rises have occurred within one minute or less. For example, 20° F rises have occurred within 30 seconds, in some instances. The rate of temperature rise then markedly levels off and rises gradually to a maximum temperature which is generally five to ten degrees higher than the leveling off point.

Figure 3:
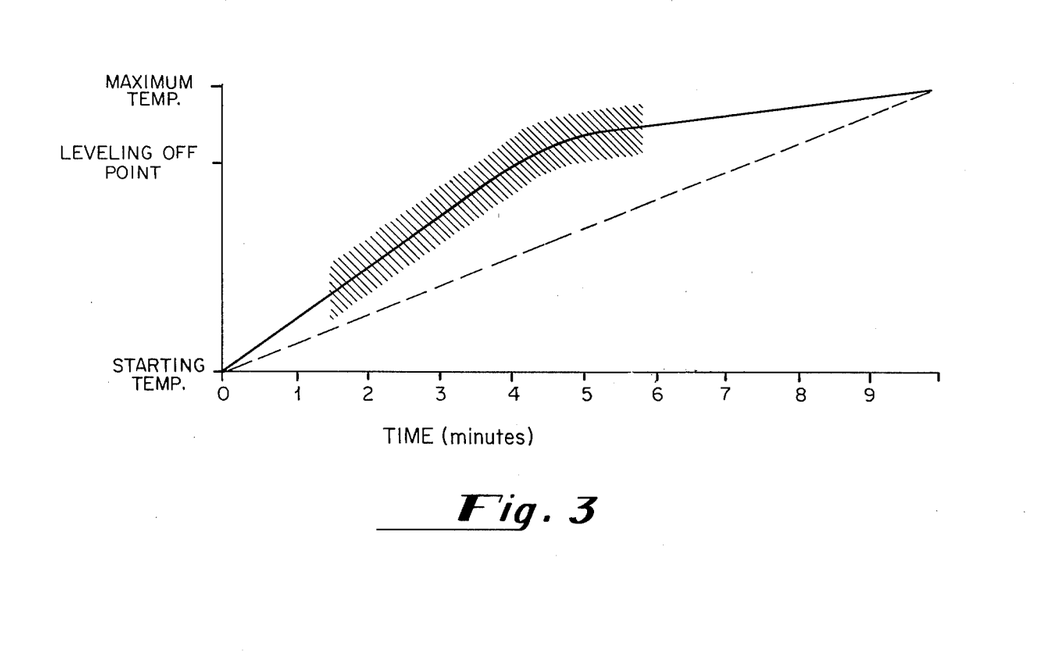
FIG. 3 is a graphic illustration of the temperature rise and time relationship in the method of this invention.

What is highly surprising, as is shown in FIG. 3, is that unless a rapid exothermic temperature rise is obtained with a leveling off point being reached in less than about five minutes, a poor, partially cured product is obtained. For example, when using an oversized chamber the temperature rise will be substantially linear as shown by the dotted line on the graph of FIG. 3. Approximately the same maximum temperature will be reached in about ten minutes. However, unlike the sample which rapidly exotherms, as shown by the solid line on the graph, the samples represented by the dotted line will be poorly cured or simply skin-cured, with a soft, uncured center portion.

It should be noted that the carbon dioxide is an essential reactant in the process of this invention. The rapid exothermic reaction with the resulting rapid cure is not obtained with other gases such as air, oxygen, nitrogen, etc. In addition, it should be further noted that heat alone is not sufficient to cause the rapid cure. When panels of the composition disclosed above are heated by external means to the same temperature as that reached in the carbon dioxide chamber, there is no substantial curing of the panel.

It should also be appreciated that there is a close interrelationship between the amount of water used in the starting mixture, the copolymer employed, and the carbon dioxide. If an amount of water substantially in excess of that defined above is employed, the mixture will not cure in the carbon dioxide chamber. This is believed to be due to a lack of relative solubility of the carbon dioxide in water, and also because the excess water may prevent the carbon dioxide from penetrating into the concrete mixture being cured.

It is also believed that an excess of pressure within the chamber 26, of carbon dioxide, may result in a rapid skin or shell cure or crusting only of the shape that will subsequently prevent carbon dioxide gas penetrating of the shape, to interior portions of the shape, thereby preventing curing at the interior portions of the shapes.

What is even more surprising, as noted above, is that if the vinyl-acetate dibutyl maleate copolymer is not included in the mixture, rapid curing will not be obtained. The exact reason the copolymer has to be in the mixture is not known.

It has also been found that curing to the completion desired, of most particularly the centers of the shapes being cured, will not be obtained, at least not to a satisfactory level, if the chamber 26 is constructed of metal, such that its interior surface is substantially (principally) metallic.

It has been found that, because the carbon dioxide gas works best in a slightly moist atmosphere (the moisture coming from the panels), for the desired advanced state of cure with respect to the interior of the shapes being cured, the chamber must be of the type that will permit the generation of moisture in the environment therein during the reaction, and that will retain and continue to regenerate such moisture in the chamber's carbon dioxide environment, from the reacting panels, presumably by not absorbing to any great degree the coldness of the carbon dioxide gas, and will allow the reaction to occur. Typically, such a chamber will have a substantially non-metallic inner surface and will preferably be wood-like on its interior. Extremely desirable advanced states of cure have been obtained through the use of a chamber that is wooden on its inner surfaces although other materials such as rubber are recognized as alternative to wood in this respect. Furthermore, it is believed that the heat-sink characteristics of a metal surface, for example, for the interior of the chamber 26, may be at least partially responsible for the fact that shapes that were attempted to be cured in chambers having interior surfaces of metal construction were not cured to a desired level of completion. It is believed that the heat given off as the reaction in the panel would start was being immediately absorbed by the cold inner surfaces of the chamber, such surfaces having been made cold by exposure to cold carbon dioxide gas. The metal chamber would not allow the exothermic hardening reaction to occur in the panels.

A further surprising effect of the method of this invention is that in spite of the fact that a relatively low amount of water is employed in the mixture, often after the advanced state of curing has occurred the substantially cured material will have free water on its surface. This is believed to be due to a combination of interrelated reactions. The initial reaction is believed to be the hydration of the oxides of the cement by the water, which is then followed by a rapid carbonization of the resulting hydroxides by the carbon dioxide. The result is that the hydrate formed on hydration of the oxide is then converted into the corresponding carbonate, and the water initially used in the hydration reaction is freed and can react with additional unreacted oxide. In theory, if both the hydration reaction and the carbonization reaction go to completion, the entire amount of water added to the starting mixture should be recovered as free water. This would, of course, account for the presence of water on the surface of some substantially cured materials. While the above theory appears to be the logical explanation of the chemistry involved, it should be appreciated that applicant does not intend to limit his invention to the above theoretical explanation of the process.

The products obtained in accordance with the method of this invention are quite unique with regard to their physical properties. When identical samples of various concrete compositions were pressed as noted above, and one sample of each composition was cured according to the method of this invention, and the other sample was cured for 28 days in the conventional manner, the samples prepared according to the method of this invention had 2 to 4 times greater compressive strength. This increase in compressive strength is quite striking and surprising.

Edges, such as 35, 36 and 37 (FIG. 2) of panels made in accordance with this invention are linear, straight and virtually regular and unbroken, as distinguished from rough, irregular edges of panels made by prior art techniques. Thus this invention yields superior products.

The rapid curing with the resulting improved properties has made it possible to continuously manufacture concrete products, on a one-after-another or serial basis, which are ready for immediate shipment and early use as soon as they are cured in the carbon dioxide chamber. Thus, the curing chamber may be set up immediately downstream of the press, and, immediately after exit of the shapes from the chambers, they may be subjected to grinding, polishing, operations, or other finishing operations as desired, some of which subject the shapes to vigorous treatment, for example, polishing and abrading by high speed diamond grinding wheels or the like, together with exposure to streams of water for cooling the grinding wheels, a physical treatment which would ordinarily disintegrate shapes prepared by prior art techniques, unless those shapes had been allowed to cure for period of weeks, or months, for example.

The advantages of this invention are especially important in the manufacture of terrazzo and terrazzo-like products, although of course such advantages are also important in the manufacture of any other shapes of the type discussed herein above. As shown in FIG. 1, the panel 22, immediately after leaving the curing chamber can be finished by grinding and polishing as aforesaid. The completed panels are made in a matter of minutes, not days or weeks as in the prior art processes. In addition, the panels are superior in all properties to prior art panels. This phenomena is equally applicable to others of the concrete shapes, and concrete-like shapes as have been discussed throughout this application.

Thus, while this invention has been described with particular emphasis on the manufacture of terrazzo and terrazzo-like panel products, cement block, and the like, the use of the method and apparatus of this invention is clearly not limited to the manufacture of terrazzo panels, or of any other building or construction material, but the method steps and apparatus of this invention can be used to produce a wide variety of different types of concrete and concrete-like products as have been discussed throughout this application. One use of the method and apparatus of this invention which is especially promising is on-site manufacturing of building blocks. The apparatus employed in the method of this invention can be made sufficiently mobile that it can be set up in a central location in an area which is to be redeveloped. When old buildings are now torn down, the masonry rubble is generally hauled away at considerable cost and simply dumped as fill in remote areas. However, using the method and apparatus of this invention, the masonry rubble can be crushed and then used as aggregate in the above-described mixture. The mixture of the masonry rubble, cement, copolymer and water is then pressed into building blocks and cured, as described above, in a carbon dioxide chamber. The blocks are then ready for early use in constructing new buildings in the redeveloped area. Using the method and apparatus of this invention, the cost of the building materials is substantially reduced, and the recycling of the building rubble also eliminates the problem of hauling away the rubble and disposing of it.

It will be understood, that even with a finished product, in accordance with this invention, such product can of course, continue to cure for a period of time thereafter, in that theoretically, concrete and concrete-like products continue to cure indefinitely. However, a cure is considered as being substantially complete in accordance with this invention, when there is some cure throughout the entire shape being processed, in an amount sufficient to enable subsequent handling, or finishing, as the case may be, depending upon the desired ends, and the circumstances of desired used.

Of course, the process and apparatus herein comprise broader inventive aspects and are useful themselves, irrespective of the degree of cure obtained. For example, curing to some degree by exposure of the shapes to continuously supplied carbon dioxide gas in a high chamber, or in a metal chamber, at least of exterior portions of the shapes, may be possible for limited applications or handling conditions, although such are not the preferred, more developed aspects of the invention.

The following examples are given by way of further illustration of the method of the present invention and are not intended in any way to limit the scope of the present invention beyond that of the subjoined claims. All parts and percentages expressed in the following examples are parts and percentages by weight, not volume, unless otherwise indicated.

EXAMPLE 1

A mixture for manufacturing terrazzo panels was prepared by blending together 21.0 kgs. of #0 cedar green marble chips, 24.5 kgs. of #1 blue and green marble chips, 67.2 kgs. of #75 white marble dust and 32.8 kgs. of portland cement.

The mixture was blended until uniform, and then an aqueous mixture comprised of three parts by weight of water and one part by weight of the copolymer consisting of 77% by weight of vinyl acetate and 23% by weight of dibutyl maleate was sprayed onto the mixture until the mixture contained 6% water and 2% copolymer, based on a total weight of the mixture.

The mixture was compressed into panels approximately 36 × 36 inches and 1 inch thick. The panels were virtually free of air voids. The panel was then ejected from the mold and found to have sufficient structural integrity that it retained its pressed shape after the supporting structure of the mold was removed. However, the panel could readily be reduced to the uncompacted state by simply crushing it with a hammer or the like.

The compressed shaped panel was supported on a chain mesh conveyor belt and fed through a gas chamber having a height of 4 inches. This chamber was charged with carbon dioxide gas introduced into the chamber through a series of orifices positioned approximately 6 inches apart from each other along both the top and the bottom of the chamber. The pressure of the carbon dioxide in the chamber was delivered at 10 PSIG from the carbon dioxide source but the pressure inside the chamber was maintained at atmospheric pressure or substantially at 0 PSIG. The speed of the conveyor belt was set so that the panels to be cured remained in the chamber for 10 minutes.

Heat probes were positioned on the surface of the panels and in the interior of the panels, and the temperature was monitored. The rise in temperature was recorded as follows:

Chart 1

| | Interior Temperature °F | Surface Temp. °F |
|---|---|---|
| 0 minute | 74 | 74 |
| 1 minute | 74 | 74 |
| 2 minutes | 78 | 84 |
| 3 minutes | 128 | 90 |
| 4 minutes | 134 | 97 |
| 5 minutes | 136 | 109 |
| 6 minutes | 139 | 112 |
| 7 minutes | 142 | 113 |
| 8 minutes | 145 | 114 |
| 9 minutes | 147 | 114 |
| 10 minutes | 147 | 115 |

The reason for the substantial difference between the interior temperature and the exterior temperature was originally believed to be caused by an initial surface cooling of the panel by the freshly introduced carbon dioxide gas. However, more recent analysis of this data recognizes that this data supports the proposition that the panels are reaching a more advanced state of cure first from the inside, with the curing of the outside lagging the inside cure by a certain time differential. This is noted because the exothermic temperature rise from the reaction with carbon dioxide gas, at any given time after commencement of the cure, but during this curing process, is greater in the interior of the panels than on the surface thereof. It should be noted, however, that in both temperature measurements there was a sudden exothermic increase in the temperature in about 5 minutes. The temperature leveled off after this initial exotherm, and came to a substantial equilibrium. In similar tests, when the temperatures were monitored for longer periods of time, it was found that the maximum temperature is reached in about 10 minutes, whereupon the temperature gradually starts to decline. This is believed to show that the reaction is substantially completed within 10 minutes or less.

The panels were evaluated for cure by initially testing the hardness. Thereafter the panels were cut in half to determine if the panels were substantially fully cured throughout their entire thickness. The panels cured as above were both very hard and also substantially fully cured (as defined herein) throughout their entire thickness. The panels immediately after curing were ground with high speed diamond wheels, using water as the cooling fluid, and then polished. The samples ground very well. The surface of the panels was examined and it was found that there was no erosion of the cement from between the aggregate particles as is encountered with poorly cured panels.

EXAMPLE 2

The terrazzo mixture described above was compacted and the panel was then stored for 4 weeks at 70°

F. This sample was then evaluated and was found to be relatively weak. On grinding, the cement eroded from the samples, indicating that the cement was at best only partially hydrated. The above procedure was repeated with the exception that the amount of water was doubled from 6% to 12%. The sample, after 4 weeks of aging, was considerably stronger than the sample produced with 6% water. However, it still had only about one-third the compressive strength of the sample produced in Example 1.

EXAMPLE 3

Example 1 was repeated, with the exception that the vinyl-acetate dibutyl maleate copolymer was omitted from the mixture. The panel when monitored during the carbon dioxide treatment did not show any exotherm. The sample after 10 minutes in the carbon dioxide chamber was removed and evaluated. The sample had not cured and could readily be broken.

EXAMPLE 4

A panel of the composition described in Example 1 was heated between a pair of electrically heated plates until the interior temperature reached 147° F. which is the maximum temperature reached in Example 1. This sample was then evaluated and it was found that it was not cured, which indicated that temperature alone is not involved in the curing process of the present invention.

EXAMPLE 5

The procedure for Example 1 was followed, except that the height of the carbon dioxide chamber was adjusted to 18 inches. The temperature was again monitored. The surface temperature followed an approximately linear rise; the interior temperature only rose slightly. When evaluated, the samples were found to be skin-cured about ⅛ inch deep from both sides, and the interior of the sample was soft and completely uncured.

The height of the chamber was gradually reduced 2 inches at a time, and samples were evaluated at each height. As the height was reduced, the amount of the uncured center portion likewise was reduced, until at about 4 inches a fully cured panel was obtained.

EXAMPLE 6

The procedure of Example 1 was repeated, except that the following mixture was used: 38 kgs. quartz crystal dust, 92 kgs. #0 mixed cedar green and light green marble chips, 38 kgs. marble dust and 70 kgs. portland cement. The temperature was monitored as in Example 1 and was found to be as follows:

Chart 2

|  | Interior Temperature ° F | Surface Temp. ° F |
| --- | --- | --- |
| 0 minutes | 69 | 74 |
| 1 minute | 74 | 74 |
| 2 minutes | 74 | 82 |
| 3 minutes | 123 | 89 |
| 4 minutes | 131 | 97 |
| 5 minutes | 136 | 103 |
| 6 minutes | 139 | 108 |
| 7 minutes | 142 | 110 |
| 8 minutes | 144 | 111 |
| 9 minutes | 146 | 112 |
| 10 minutes | 147 | 112 |

The panels were fully cured and very hard. Some difficulty was encountered in grinding because of the exceptional hardness of the quartz particles.

"Fully cured" as used in these examples, means substantially cured or an advanced state of cure, throughout the full depth or thickness of the panels.

EXAMPLE 7

The procedure of Example 1 was repeated except that the following mixture was employed: 28.6 kgs. #0 white marble chips, 21 kgs. ground limestone, 21 kgs. #75 marble dust, 25.2 kgs. portland cement and 7 kgs. of a 3:1 mixture of water, and the copolymer of Example 1. The panels were cured in the manner described in Example 1. The temperature readings at the interior of the samples were taken and were found to be as follows:

Chart 3

| Time | Temperature ° F |
| --- | --- |
| start | 67 |
| ½ minutes | 68 |
| 1 " | 74 |
| 1½ " | 79 |
| 2 " | 86 |
| 2½ " | 95 |
| 3 " | 103 |
| 3½ " | 110 |
| 4 " | 115 |
| 4½ " | 120 |
| 5 " | 125 |
| 5½ " | 130 |
| 6 " | 134 |
| 6½ " | 138 |
| 7 " | 140 |
| 7½ " | 143 |
| 8 " | 146 |
| 8½ " | 147 |
| 9 " | 149 |
| 9½ " | 150 |
| 10 " | 152 |

The samples were fully cured and very hard. The panel ground easily, and the surface was exceptionally smooth.

EXAMPLE 8

Building blocks were prepared from the following mixture: 20 kgs. crushed concrete, 22 kgs. crushed burnt face brick, 25 kgs. ground limestone, 25 kgs. portland cement, 2 kgs. vinyl acetate-dibutyl maleate copolymer, 6 kgs. water. The mixture was prepared as in Example 1 and pressed into blocks 8 × 12 × 2½ inches thick. The blocks were cured at atmospheric pressure or 0 PSIG based upon a delivery pressure from the source of 10 PSIG in a 4 inches high carbon dioxide chamber for ten minutes. The blocks were found to be fully cured (as defined herein) and could be used for the formation of walls or the like in a building at an earlier time than is customary in the art.

EXAMPLE 9

Figure 4:
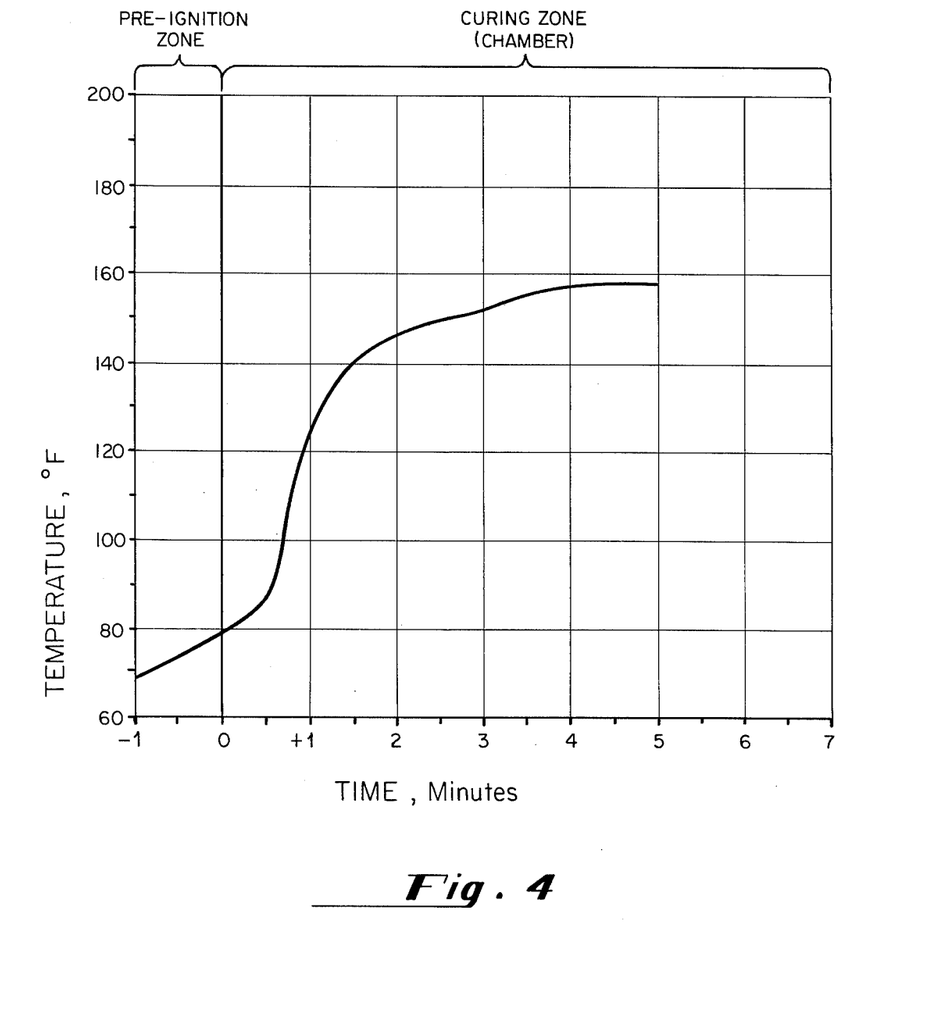
FIG. 4 is a graphic illustration of a preferred temperature-time relationship in accordance with this invention.

The mix of Example 1 was prepared being blended and compressed into panels like in Example 1. Upon delivery to the chamber, the panel was exposed to carbon dioxide gas emanating from the chamber inlet in the direction of the panel. Preignition of the panel occurred as discussed herein, with the temperature in the interior of the panel increasing with time as indicated in FIG. 4. It will be seen that the exposure for one minute (as the conveyor moved the panel from a point 3 feet ahead of the chamber to a point at which the leading edge of the panel contacted the inlet flaps (0 minutes in FIG. 4)) caused an 8° F rise in temperature (from 69° F to 77° F). One minute later, when the panel was just completely inside the chamber, the temperature was 122° F, having increased sharply from which point the rise began to taper off as indicated, but with the temperature still increasing.

Evaluation of this panel to determine the extent of curing showed that the panel was substantially cured (as defined herein) throughout its entire thickness, and was very hard. The panel was then immediately ground with high speed diamond wheels using water as the cooling fluid and then polished. The final product appeared substantially as did the final product for Example 1.

While minor variations exist in the control of various parameters between the test of Example 9 and the test of Example 1, it is believed that the reason for the more rapid temperature rise in the test of Example 9 resides most likely in the fact that the pressure of carbon dioxide gas delivered to the chamber (delivery pressure of about 2 PSIG) was lower than the delivery pressure from the test of Example 1, although for both of the tests, the pressure inside the chamber was at substantially atmospheric pressure. However, it is believed that the differences in delivery pressure affect the velocity of flow inside the chamber, and therefore the velocity of flow of carbon dioxide gas within the chamber during the test of Example 9 was less than, for example, the velocity of flow within the chamber during the test of Example 1. Aside from economic factors, of using less carbon dioxide gas, when delivering it at an almost negligible delivery pressure, the use of less gas can also affect the reaction within the panel. It is believed that the reason for this is that the delivery of carbon dioxide gas, being generally cold, if flushed too rapidly through the chamber can carry off some of the heat of the reaction within the panel, whereas, if the velocity of flow of carbon dioxide gas within the chamber is relatively slow, it does not rob the heat from the panel undergoing an exothermic reaction to the extent that can happen if too much carbon dioxide gas is utilized. Thus, with a reduced velocity of flow of gas within the chamber the panel is permitted to more fully exotherm and at an earlier time, giving rise to rapid temperature increase illustrated in FIG. 4.

It will be apparent from all the foregoing that various modifications may be made in the details of construction of the apparatus of this invention, and in the use and operation of the method of this invention, including but not limited to operating with variations in the several parameters, all within the spirit and scope of the invention as recited in the appended claims.

What is claimed is:

1. A method of rapidly manufacturing concrete or like products having an advanced state of cure comprising the steps of blending together a calcareous cementitious binder, an aggregate, the binder being present in a percentage of about 6–100, based upon total of binder plus aggregate; vinyl acetate-dibutyl maleate copolymer and water to form a mix, wherein the percentage by weight of water does not exceed about 10%, wherein the weight of vinyl acetate-dibutyl maleate copolymer in the mix is within the range of about 1% to about 2% based on the solids content of the mix, compressing the mixture under sufficient pressure to maintain the mixture in a predetermined shape upon removal of the shape relative to the mold, moving said shape in a predetermined direction and exposing the shape to a preignition in an ambient atmosphere containing admixed carbon dioxide moving counter-current to said shape, subsequently subjecting said shape to an atmosphere consisting essentially of carbon dioxide gas containing minor amounts of air by moving the shape through a chamber, simultaneously feeding carbon dioxide gas to the chamber during the movement of the shape therein, maintaining the pressure within the chamber at substantially atmospheric pressure, continuing the feed to cause an exothermic temperature rise in the shape of at least 20° to 40° F in less than about 5 minutes, and subjecting the shape to further amounts of carbon dioxide after its emergence from the exit end of said chamber.

2. The method of claim 1, wherein the calcareous cementitious binder comprises at least about 4% portland cement.

3. The method of claim 1, wherein the percentage by weight of water and vinyl acetate-dibutyl maleate copolymer together in the mix is about 3.1% to about 9.2%.

4. The method of claim 1, wherein the weight ratio of water to vinyl acetate-dibutyl maleate copolymer in the mix is about 3:1.

5. The method of claim 1, wherein the copolymer is composed of about 3 parts by weight of vinyl acetate and about 1 part by weight of dibutyl maleate.

6. The method of claim 1, wherein the binder is selected from the group consisting of calcareous lime, marble dust, calcareous lime dust, calcareous fly ash, calcareous white, grey or block grey cement, aqua dust, calcareous lumnite, calcareous quick lime, and wherein the aggregate is selected from the group consisting of ground glass, sand, calcareous limestone, clay, siliceous shale, extrusive lava, siliceous silica flour, gravel, marble, marble dust, siliceous limestone, granite, coarse ground granite, shells, quartz, steel rod, brass chips, slate, aqua dust, calcareous sandstone, gneise, schist, siliceous trap, and quartzite.

7. The method of claim 1, wherein the feed of carbon dioxide gas during movement of the shape into the chamber is sufficient to effect an exothermic temperature rise of at least 20° F in less than about one minute.

8. The method of claim 1, wherein the feed of carbon dioxide gas during movement of the shape into the chamber is sufficient to effect an exothermic temperature rise of at least 20° F by the time the shape has completely entered the chamber.

9. In a method of rapidly manufacturing concrete or like products having an advanced state of cure comprising a sufficiently low moisture cementitious mix to maintain its shape after molding into a shape and during subsequent curing, said mix comprising water and a vinyl acetate - dibutyl maleate copolymer, wherein the weight of vinyl acetate - dibutyl maleate in the mix is within the range of about 1% to 2% based on weight of solids of the mix, the percentage by weight of water not exceeding 10%, the steps which comprise molding the mixture into a predetermined shape by compressing the mixture under sufficient pressure to maintain the mixture in the predetermind shape upon removal of the shape relative to the mold, moving the shape in a predetermined direction, exposing the shape while it is so moving to preignition in an atmosphere containing a controlled amount of carbon dioxide which is moving countercurrent to the movement of said shape, then exposing said shape to an atmosphere of carbon dioxide gas admixed with minor amounts of air by moving the shape through a chamber the inner surfaces of which are substantially non-metallic, the height of the chamber being about 1.025 to about 4 times the height of the shape, but not exceeding the height of the shape by more than about 4½ inches, simultaneously feeding carbon dioxide gas to the chamber during the movement of the shape therein, maintaining the pressure, and continuing the feed to cause an exothermic temperature rise throughout the shape of at least 20° F – 40° F in less than about 5 minutes.

10. The method of claim 9, including preliminarily exposing the shape to sufficient flowing carbon dioxide gas just prior to entry of the shape into the chamber, to initiate an exothermic temperature rise.

11. The method of treating a mix having concrete forming characteristics or the like for facilitating the curing thereof comprising the steps of adding water and a vinyl acetate-dibutyl maleate copolymer, said mix comprising water and a vinyl acetate-dibutyl maleate copolymer, wherein the weight of vinyl acetate-dibutyl maleate is within the range of about 1% to about 2% based on the weight of solids of the mix, the percentage by weight of water in the mix not exceeding 10%, molding the mix into a formed shape in a press, discharging the then formed shape from the press onto a conveying means, moving the shape along a predetermined path on the conveying means, exposing the shape, while it is so moving, to an atmosphere consisting essentially of carbon dioxide gas during its movement along said path, causing said carbon dioxide gas to permeate said conveying means to subject said shape to said gas by flow of said gas through said conveying means, said exposing step being performed by passing the shape through a yieldingly shielded chamber while simultaneously continuously delivering carbon dioxide gas to the chamber, causing a portion of said carbon dioxide gas to flow counter-currently thereby causing a preignition of said shape before its entry into said chamber, maintaining the gas pressure in said chamber at substantially atmospheric pressure, all as part of a continuous process.

12. The method of claim 11, wherein the exposing step is done substantially immediately after formation of the shape.

13. The method of claim 12, wherein a plurality of shapes are identically treated in serial fashion as part of a manufacturing process, with the movement of the shapes through the chamber being an elongated horizontal movement, and with the shapes being subjected to a highly abrasive action, substantially immediately following discharge from the chamber.

* * * * *